J. P. REINECKE, E. C. WEBER & E. A. KRAH, Jr.
THERMOSTATIC TEMPERATURE REGULATING APPARATUS.
APPLICATION FILED NOV. 25, 1911.

1,087,908.

Patented Feb. 17, 1914.
2 SHEETS—SHEET 1.

WITNESSES

INVENTORS

UNITED STATES PATENT OFFICE.

JOHN P. REINECKE, OF CRAFTON, AND EDWARD C. WEBER AND EDWARD A. KRAH, JR., OF PITTSBURGH, PENNSYLVANIA.

THERMOSTATIC TEMPERATURE-REGULATING APPARATUS.

1,087,908.  Specification of Letters Patent.  Patented Feb. 17, 1914.

Application filed November 25, 1911. Serial No. 662,415.

*To all whom it may concern:*

Be it known that we, JOHN P. REINECKE, a resident of Crafton, and EDWARD C. WEBER and EDWARD A. KRAH, Jr., residents of Pittsburgh, in the county of Allegheny and State of Pennsylvania, have invented a new and useful Improvement in Thermostatic Temperature-Regulating Apparatus, of which the following is a specification.

This invention relates to a thermostatic apparatus for regulating the temperature of a hot water supply.

The object of the invention is to provide in connection with such an apparatus a construction and arrangement of parts in which the controlling member of the thermostat and operating mechanism for the valve or valves will be located out of contact with the passing supply of water and readily accessible for the purpose of replacement and repair.

A further object of the invention is to provide such a construction which will be practically noiseless in operation and in which the hammering or pounding usually incident to the operation of such devices is dispensed with and avoided, and in which the regulating valve or valves may be operated, controlled or regulated within narrow limits and with consequent exactness and nicety.

A further object of the invention is to provide an improved construction of the character stated in which separate valves are arranged to automatically control the supplies of hot and cold water in such manner that the operating means for one valve may be moved independently of that for the other valve, to prevent breakage or strain of the parts.

Figure 1:
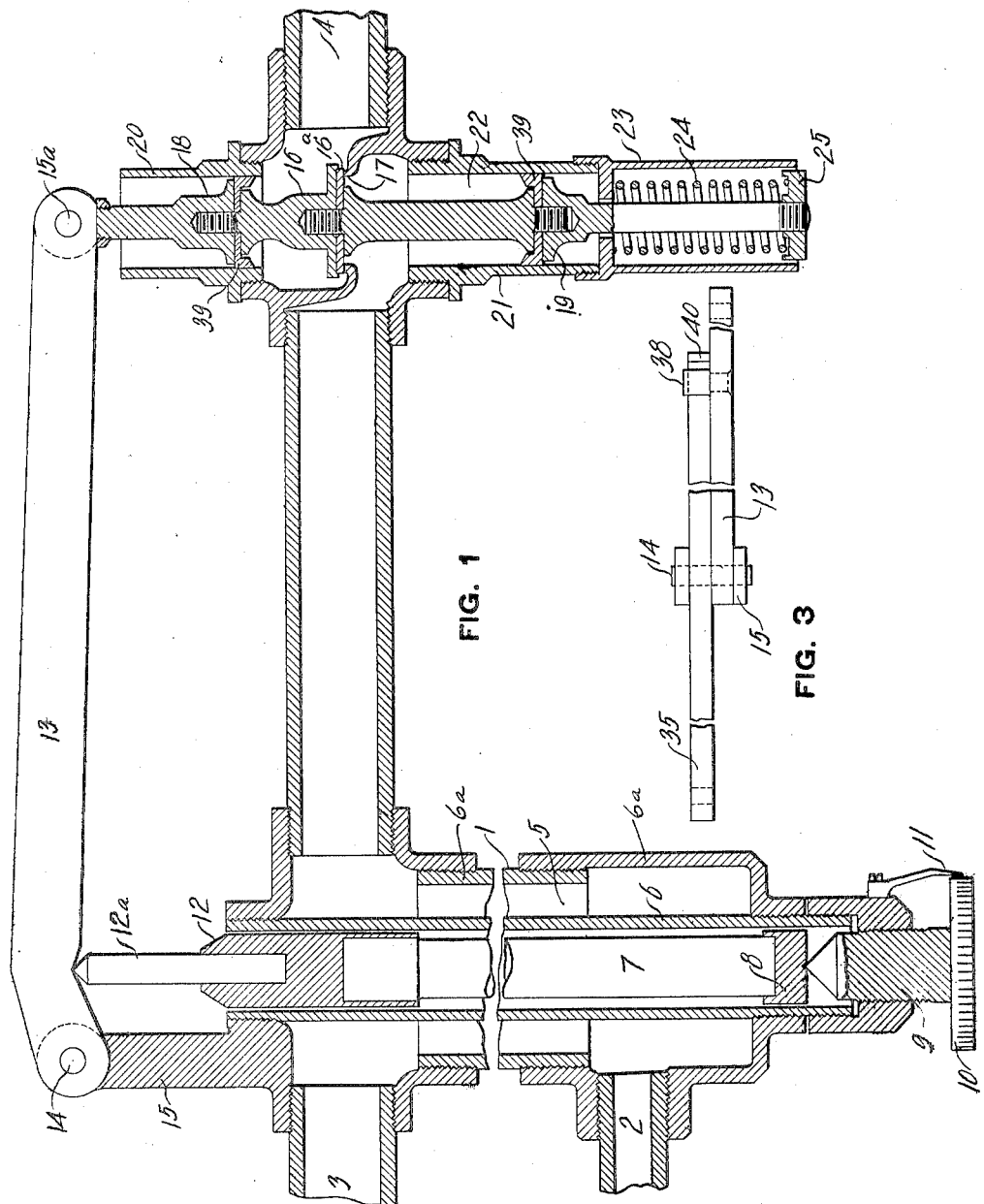
Figure 2:
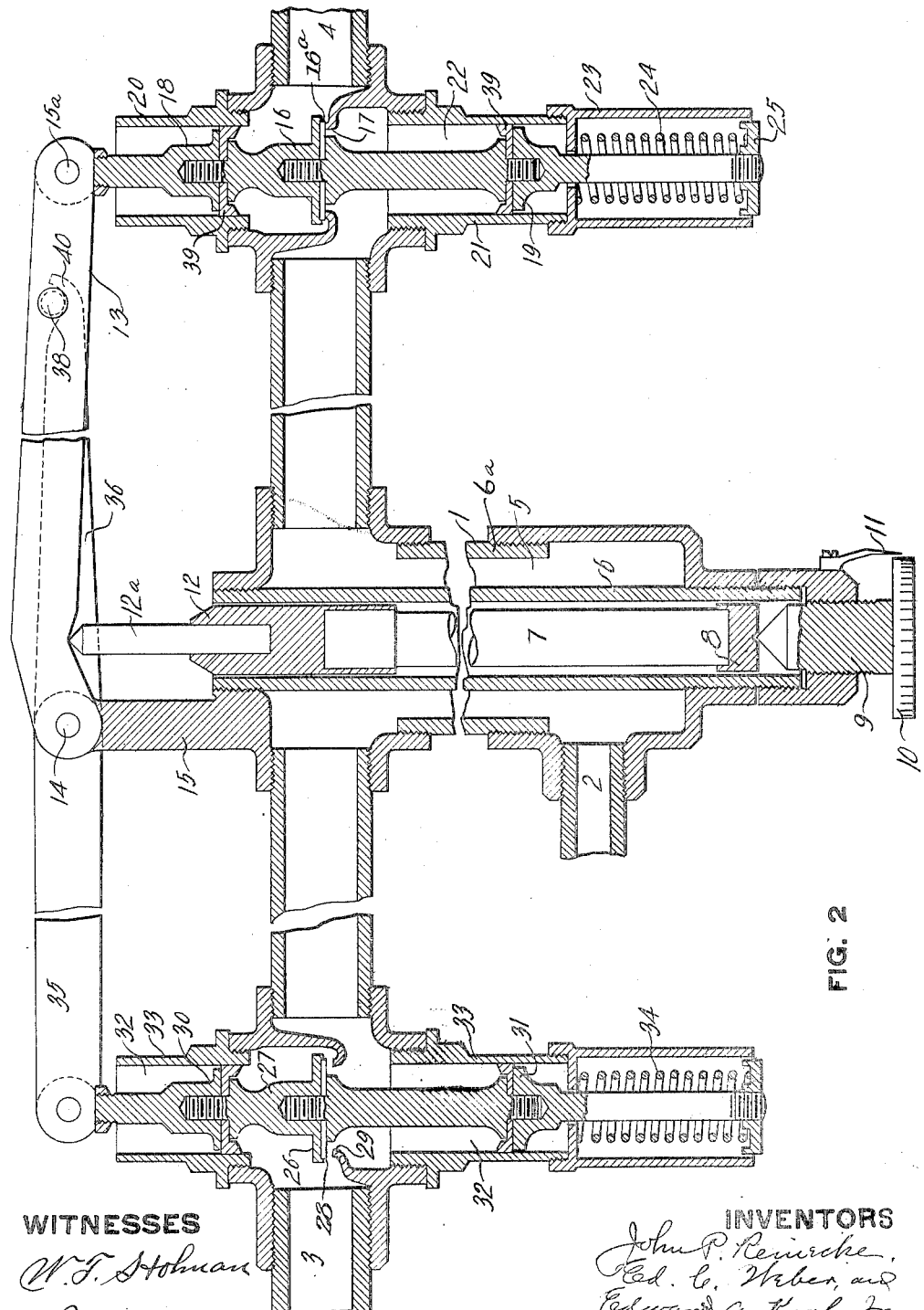

Referring to the accompanying drawings, Figure 1 is a diagrammatic illustration of an arrangement of parts according to our invention in which one controlling valve is used; Fig. 2 is a similar diagrammatic illustration, showing an arrangement of our invention with separate controlling valves for the hot and cold water; and Fig. 3 is a detail view of the levers shown in Fig. 2.

Our invention is adapted for use in connection with any arrangement in which a supply of water is to be furnished at a given mean temperature, which it is desired to have constant or regulatable within certain limits. It may be applied for controlling the temperature of water supplied to shower baths, bath tubs or for general domestic use. We have illustrated our invention as applied for the control of the temperature of water furnished, for example, to a shower bath.

The arrangement illustrated comprises a suitable casing 1 having an outlet at 2 for connection to and supply of the water to a shower bath or any other desired device, a connection at 3 for the supply of cold water and a connection at 4 for the supply of hot water. It will be understood that each of the connections 2, 3 and 4 may be supplied with suitable means for cutting off or regulating the supplies therethrough, as is usual. The casing 1, as illustrated, is of double tubular formation and incloses an annular or ringlike interior space 5 comprising a mixing chamber into which the connections 3 and 4 lead and which serves to thoroughly mix the supplies of hot and cold water furnished thereto. The interior wall 6 and the exterior wall or tube 6$^a$ of the double tubular casing 1 form one element of a thermostat or temperature regulating device. As stated, the wall 6 is of hollow, tubular formation and within it is arranged a rod or bar 7, of less diameter than the tube 6, and which is preferably formed of some material having a very low co-efficient of expansion, for example, porcelain, wood, or a similar material. The outer and inner walls 6$^a$ and 6 of the casing 1 are preferably formed of some material having high co-efficient of expansion, as for example, copper, and are so constructed throughout their length. In the form shown, the rod or controlling member of the thermostat 7 is shown as provided with a cap or head 8 at its lower end, having a socket which rests upon the upper pointed or shaped end of a screw adjusting member 9 threaded into the lower end of the casing 1 and having a graduated head 10 for coöperation with a pointer 11, fixed to the casing 1, to form a scale for the indication of the temperature of the water, as hereafter stated. The opposite or upper end of the porcelain rod or thermostat member 7 is provided with a cap or head 12, preferably constructed of steel or other metal and having projecting therefrom a hardened steel rod or bar 12$^a$, having a sharp or pointed upper end for engaging or contacting with a controlling lever 13, fulcrumed at 14 to a vertical upper projection 15 from a portion of the casing 1. The outer end of the lever 13 is pivotally connected at 15ᵃ to a valve rod 16 which, as shown, is arranged to control the supply of hot water to the mixing chamber. The valve rod 16 is provided with a valve disk 16ᵃ arranged to seat against a face 17 to more or less cut off the hot water supply. On opposite sides of said valve or disk 16ᵃ, the valve rod 16 is provided with pistons 18 and 19 of equal area and arranged to slide in cylinders 20 and 21 in the valve chamber 22, and provided with cup leathers 39 or any other preferred form of packing to form a water tight seal. This arrangement of pistons, by reason of the similar diameter thereof, serves to balance the pressures on opposite sides of the valve and prevent it from hammering when it closes. The valve, consequently may be operated with great ease and regularity of action. In a tubular extension 23 from the lower end of the valve casing is mounted spring 24, bearing at one end against the valve casing and at the other against a nut or other member 25 screw threaded and adjustably mounted on a rod or projection on the end of valve rod 16. The adjustment of the nut 25 serves to regulate the tension of the spring and of the force tending to seat the valve disk against the face or seat 17.

In Fig. 2 we have shown an arrangement in which an additional valve 26 is included for regulating the supply of cold water. The construction of this valve is identical with that illustrated in Fig. 1 for regulating the supply of hot water. As shown, it comprises a valve rod 27 having a valve disk or face 28 arranged to bear against a valve seat 29, and at each end thereof is provided with balancing pistons 30 and 31 slidably mounted in cylindrical portions 32 of the valve casing 33. A spring 34 is provided of similar construction and arrangement to the spring 24 and adjustably arranged to seat the valve against the face 32. Connected to the upper end of the valve rod 27 is a lever 35. This lever is pivoted upon the same pivot 14 which furnishes a fulcrum for the lever 13 referred to, which controls or regulates the hot water supply valve. The lever 35 is of greater length than the lever 13 and is provided with a projecting end 36 on the opposite side of the fulcrum from the valve 26, which has a hook or curved end 40 which engages a projection or pin 38 on one side of the lever 13. It will be understood that in the arrangement shown the length of lever 35 from its fulcrum 14 to its pivotal connection to its valve is the same as the distance from the fulcrum 14 to the pivot 15 of the lever 13.

The operation of our improved thermostatic control apparatus is believed to be clear from the foregoing description and the accompanying drawings. Assuming that the hand regulating cocks or valves are all open, cold water will be supplied through the connection 3 and hot water through the connection 4, the mixed water being supplied through the connection 2 to the shower bath or other device. Under normal conditions, with the arrangement shown in Fig. 1, a full supply of cold water will be admitted through the connection 3 and when the valve 16ᵃ is fully open a full supply of hot water through the connection 4. We may assume that the valve 16ᵃ remains fully open for a short time so as to supply the necessary amount of hot water for the cold water coming through the connection 3. Should the temperature of the water in the mixing chamber 5 now rise or increase above what is normal, safe or desired, the thermostatic element 1, or 6 and 6ᵃ, being copper with high co-efficient of expansion, expands and increases in volume with consequent lengthening of the casing 1 as a whole. This is not true, however, of the rod or thermostat element 7, which is formed of porcelain, wood or other material having a low co-efficient of expansion and which, therefore, does not expand to the same amount as the tubes 6 and 6ᵃ. As a result of the foregoing the length of metal of the casing 1 between the abutment 9 and the fulcrum 14 increases, while the length of the thermostat 7 between the same abutment and the end of the bearing member 12ᵃ increases but very slightly, and materially less than does the casing 1. This has an effect as though the fulcrum or pivot 14 is moved outwardly or that the bearing member 12ᵃ moves inwardly. The consequent change in the relative positions of the fulcrum 14 and bearing member 12ᵃ gives the spring 24 an opportunity to, and it does, more or less, move the valve rod 16 downwardly, operating therefore, to close more or less the valve disk against the seat 17 and shut off the supply of hot water, the closing of this valve depending upon the degree of relative expansion of the thermostatic elements and the amount of abnormal rising in the temperature of the supply of water furnished to the shower bath or other device. If the water is too hot, the valve 16ᵃ will close entirely, in which case cold water alone will be supplied through the connection 3 until the temperature of the thermostatic elements has been restored to normal and the hot water supply again opened up. If the temperature of the water in the mixing chamber drops by reason of the shutting off or decreasing of the supply of hot water, or a drop in its temperature, the casing 1 contracts more than does the porcelain thermostat 7. Consequently, the bearing member 12ᵃ is pushed outwardly and raises the lever and opens the valve, thus admitting an additional quantity of hot water and raising the temperature of the water supplied through the connection 2.

In the form of the device disclosed in Fig. 2, the construction is different from that of Fig. 1, only in that an additional valve is supplied for controlling the supply of cold water. In this form of the device as the bearing member 12ª rises or the fulcrum 14 drops, the lever 13 will be raised at its right hand end and will open the valve 16ª and admit more hot water in the manner stated above. At the same time the spring 34 of the left hand or cold water valve will act on the valve rod 27 and cause oscillation of lever 35 in such manner that the hook 40 will rise with and hug the pin 38. This will cause the spring 34 to close the cold water valve 28 more or less according to the difference of temperature. Likewise, when the fulcrum 14 rises or the bearing member 12ª drops by reason of change in temperature of the thermostatic elements, the valve 16ª will be more or less closed or seated by reason of the operation of the spring 24 on the valve rod 16. The levers 13 and 35, in the form shown are to a certain extent independent of each other by reason of the construction of the pin 38 on lever 13 and hook 40 on lever 35. This arrangement is provided as a safety device to prevent breakage or undue strain of the parts under unusual conditions. For example, should the supply of cold water to the connection 3 greatly decrease or be shut off altogether by the drawing of cold water from other points of the water supply system of the house or building, or for any other reason, nothing but hot water would be supplied to the mixing chamber. This might well so expand the casing of copper as to entirely close the cold water valve. Continued flow of hot water might then further expand the casing under which circumstance, if the levers 13 and 35 were rigidly coupled, the parts would be strained and possibly broken. The loose coupling of the levers, however, permits the lever 13 to rise independently of the lever 35 and no damage can result.

What we claim is:—

1. The combination of a casing having a mixing chamber therein and provided with hot and cold water connections and an outlet, said casing forming one member of a thermostat, a thermostat member adjacent to the casing, a valve casing in one of said connections provided with a seat and with cylinders on opposite sides thereof, connections between the valve and thermostat for automatically controlling the valve, and pistons connected to opposite sides of said valve and traveling in said cylinders, and arranged to equalize the pressures on opposite sides thereof.

2. The combination of a casing having a mixing chamber therein and provided with hot and cold water connections and an outlet, said casing forming one member of a thermostat, a thermostat member adjacent to the casing, a valve casing in one of said connections provided with a seat and with cylinders on opposite sides thereof, connections between the valve and thermostat for automatically controlling the valve, and pistons connected to opposite sides of said valve, said cylinders and pistons being of the same diameter and arranged to prevent hammering or chattering of said valve.

3. The combination of a casing having a mixing chamber therein and provided with hot and cold water connections and an outlet, said casing forming one member of a thermostat, a thermostatic member coöperating with said casing, a valve in each of said connections for regulating the supply therethrough, and connections for operating said valves, comprising a lever connected to the thermostat and connected to one of said valves, and a second lever connected to the first named lever and operating the other of said valves.

4. The combination of a casing having a mixing chamber therein and provided with hot and cold water connections and an outlet, said casing forming one member of a thermostat, a thermostatic member coöperating with said casing, a valve in each of said connections for regulating the supply therethrough, connections for operating said valves, comprising oppositely disposed levers fulcrumed on the casing, one of said levers bearing against one of said thermostatic members and operating one valve, the other lever being arranged to operate the other valve, and a loose connection between said levers.

5. The combination of a casing having a mixing chamber therein and provided with hot and cold water connections and an outlet, said casing forming one member of a thermostat, a thermostat member outside of said chamber and adjacent to said casing, a valve casing in one of said connections, a valve therein for regulating the supply therethrough and to said mixing chamber, balancing pistons connected to opposite sides of said valve and each subject on one side to pressure within said casing to equalize the pressure on opposite sides of said valve, one of said pistons being accessible from the outside of said valve casing, and connections between said last named piston and the outside thermostat member for operating the valve.

6. The combination of a casing having a mixing chamber therein and provided with hot and cold water connections and an outlet, said casing forming one member of a thermostat, a thermostat member adjacent to the casing, a valve casing in one of said connections provided with a seat and with cylinders on opposite sides thereof, one of said cylinders being open at its outer end, pistons connected to opposite sides of said valve and traveling in said cylinders and arranged to equalize the pressure on opposite sides of said valve, and connections from the thermostat to the valve extending through the open end of said cylinder for automatically controlling the valve.

7. The combination of a casing having inner and outer walls inclosing an annular chamber and forming a thermostatic element, hot and cold water connections to said casing and communicating with said chamber, an abutment within the inner wall and at one end of said casing, a thermostatic element within the inner wall of the casing and resting loosely on said abutment and coöperating with the casing, a valve in one of said connections for controlling the supply therethrough, and connections between the other end of the loose thermostatic element and said valve for controlling the valve.

8. The combination of a casing having inner and outer walls inclosing an annular chamber and forming a thermostatic element, hot and cold water connections to said casing and communicating with said chamber, an abutment within the inner wall and at one end of said casing, a thermostatic element within the inner wall of the casing and resting loosely on said abutment and coöperating with said casing, a valve casing in one of said connections, a valve in said casing and having a member projecting to the outside thereof, a pivoted lever connected to said member, and a loose connection between said lever and said loose thermostatic element for operating said lever and valve.

9. The combination of a casing having inner and outer walls inclosing an annular chamber and forming a thermostatic element, hot and cold water connections to said casing and communicating with said chamber, an adjustable abutment threaded into one end of said casing and projecting into the space within said inner wall, said abutment being accessible for regulation from the outside of said casing, a thermostatic member within the inner wall of the casing and bearing at one end against said abutment, a lever having a fixed fulcrum on the outside of said casing and bearing against the other end of said thermostatic member, a valve in one of said connections for controlling the supply therethrough, and connections between said valve and lever.

10. The combination of a casing having inner and outer walls inclosing an annular chamber and forming a thermostatic element, hot and cold water connections to said casing and communicating with said chamber, an adjustable abutment screw threaded into one end of said casing and accessible from the outside thereof and projecting into the space within the inner wall thereof, a thermostatic member housed within said space and having one end projecting from the other end of the casing and its other end resting loosely against the inner end of said abutment, a valve in one of said connections, and connections between said thermostat and said valve for operating the latter.

In testimony whereof, we have hereunto set our hands.

JOHN P. REINECKE.
ED. C. WEBER.
EDWARD A. KRAH, Jr.

Witnesses:
E. L. HYDE,
F. W. WINTER.